United States Patent
Murali et al.

(10) Patent No.: US 9,756,572 B2
(45) Date of Patent: Sep. 5, 2017

(54) REDUCTION OF POWER CONSUMPTION IN A HALF-DUPLEX TRANSCEIVER

(71) Applicant: TEXAS INSTRUMENTS INCORPORATED, Dallas, TX (US)

(72) Inventors: Sriram Murali, Karnataka (IN); Sarma Gunturi, Karnataka (IN); Jaiganesh Balakrishnan, Bangalore (IN); Murugesh Subramaniam, Karnataka (IN); Harikrishna Parthasarathy, Karnataka (IN)

(73) Assignee: Texas Instruments Incorporated, Dallas, TX (US)

(*) Notice: Subject to any disclaimer, the term of this patent is extended or adjusted under 35 U.S.C. 154(b) by 320 days.

(21) Appl. No.: 14/560,011

(22) Filed: Dec. 4, 2014

(65) Prior Publication Data

US 2016/0165536 A1    Jun. 9, 2016

(51) Int. Cl.
| | |
|---|---|
| H04W 52/02 | (2009.01) |
| H04W 76/04 | (2009.01) |
| H04L 5/16 | (2006.01) |
| H04L 25/49 | (2006.01) |
| H04L 27/14 | (2006.01) |
| H04B 1/44 | (2006.01) |

(52) U.S. Cl.
CPC ............ *H04W 52/028* (2013.01); *H04B 1/44* (2013.01); *H04L 5/16* (2013.01); *H04W 76/048* (2013.01); *H04L 25/4902* (2013.01); *H04L 27/14* (2013.01); *Y02B 60/50* (2013.01)

(58) Field of Classification Search
CPC combination set(s) only.
See application file for complete search history.

(56) References Cited

U.S. PATENT DOCUMENTS

| | | | |
|---|---|---|---|
| 2006/0139005 A1* | 6/2006 | Niculae | H02J 7/0013 320/132 |
| 2007/0173202 A1* | 7/2007 | Binder | H04B 7/15542 455/68 |
| 2012/0170690 A1* | 7/2012 | Ngo | H03F 1/0227 375/340 |

* cited by examiner

*Primary Examiner* — Yee Lam
(74) *Attorney, Agent, or Firm* — Lawrence J. Bassuk; Charles A. Brill; Frank D. Cimino

(57) ABSTRACT

Circuits and methods for reducing power consumption in a half-duplex transceiver are disclosed. In an embodiment, a power management circuit of half-duplex transceiver includes direct current to direct current (DC-DC) converter and snooze mode controller. The DC-DC converter includes switching circuit and driver circuit to drive the switching circuit. The DC-DC converter provides power supply to at least one element of a transmitter sub-system of the half-duplex transceiver, and operates in snooze control modes. The snooze mode controller is coupled to the DC-DC converter and configured to generate a control signal based on at least one transceiver operating input, where the control signal causes the DC-DC converter to operate in one of the snooze control modes, the snooze control modes corresponding to snooze duty cycles and where in each snooze control mode, the switching circuit and the driver circuit remain in an OFF-state based on a respective snooze duty cycle.

15 Claims, 6 Drawing Sheets

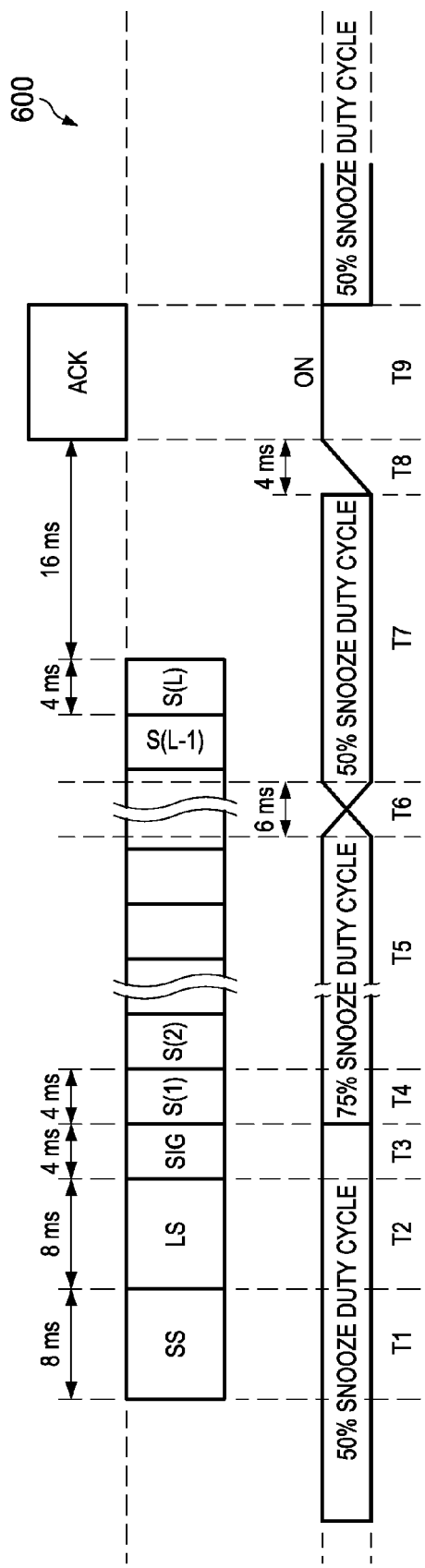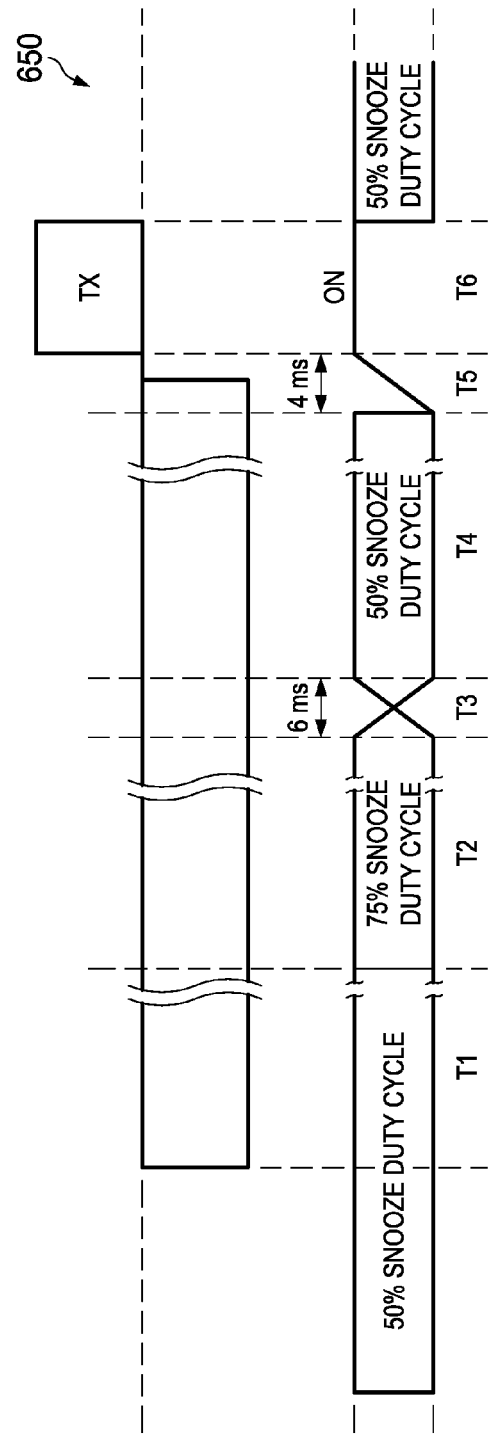
FIG. 6A
FIG. 6B

REDUCTION OF POWER CONSUMPTION IN A HALF-DUPLEX TRANSCEIVER

TECHNICAL FIELD

The present disclosure generally relates to the field of reduction of power consumption in a half-duplex transceiver.

BACKGROUND

A transceiver is used in communication systems for transmitting and receiving information or data. The transceiver is of generally two types namely, a full-duplex transceiver and a half-duplex transceiver. The half-duplex transceiver is used in applications that do not require simultaneous transmission and reception of data. The half-duplex transmitter includes a transmitter subsystem and a receiver subsystem operating in transmission phase and reception phase, respectively, in different time periods. For example, during the transmission phase, the transmitter subsystem is in active state and the receiver subsystem is in an inactive state, and vice-versa in the reception phase. However, during a reception phase, even though elements of the transmitter subsystem are in the inactive state, power is still being supplied by a direct current to direct current (DC-DC) converter to components, for example, a power amplifier (PA) of the transmitter subsystem of the half-duplex transceiver. Such supply of power to components of the transmitter subsystem during the reception phase results in unnecessary power consumption. Moreover, it is not feasible to switch the DC-DC converter between an ON-state and an OFF-state for every transition between the transmitter phase and the receiver phase, as a settling time of the DC-DC converter is generally higher than a turn-around time or transition time between the receiver subsystem and the transmitter subsystem. For example, a turn-around time of the receiver subsystem to the transmitter subsystem is around 4 micro seconds that is significantly smaller as compared to a settling time of the DC-DC converter, for example, 300 micro seconds.

In one technique, the DC-DC converter can be configured to toggle between a pulse width modulation (PWM) mode for the transmission phase and a pulse frequency modulation (PFM) mode for the reception phase to save the battery current. However, the switching time between the two modes (PWM and PFM) is still significantly greater than the turn-around time between the transmitter subsystem and the receiver subsystem, and accordingly, such a technique limits the speed of transition between the transmitter subsystem and the receiver subsystem and also increases the number of circuit elements for the PFM mode or to support operations of the PFM mode.

SUMMARY

This Summary is provided to introduce a selection of concepts in a simplified form that are further described below in the detailed description. This Summary is not intended to identify key or essential features of the claimed subject matter, nor is it intended to be used as an aid in determining the scope of the claimed subject matter.

Various circuits and methods for reducing power consumption in a half-duplex transceiver are disclosed. In an embodiment, a power management circuit of a half-duplex transceiver includes a direct current to direct current (DC-DC) converter and a snooze mode controller. The DC-DC converter includes a switching circuit and a driver circuit to drive the switching circuit. The DC-DC converter is configured to provide power supply to at least one element of a transmitter sub-system of the half-duplex transceiver. The DC-DC converter is further configured to operate in a plurality of snooze control modes. The snooze mode controller is coupled to the DC-DC converter and configured to generate a control signal based on at least one transceiver operating input. The control signal causes the DC-DC converter to operate in one of the plurality of snooze control modes. The plurality of snooze control modes correspond to a plurality of snooze duty cycles. In each snooze control mode of the plurality of snooze control modes, the switching circuit and the driver circuit remain in an OFF-state based on a respective snooze duty cycle.

In another embodiment, a method of reducing power consumption in a half-duplex transceiver is disclosed. The method includes receiving at least one transceiver operating input from at least one of a physical layer (PHY) subsystem and a medium access control layer (MAC) subsystem of the half-duplex transceiver. The method includes generating a control signal based on the at least one transceiver operating input. Additionally, the method includes providing the control signal to a direct current to direct current (DC-DC) converter of the half-duplex transceiver to operate the DC-DC converter in one of a plurality of snooze control modes based on the control signal. The DC-DC converter includes a switching circuit and a driving circuit to drive the switching circuit, and the DC-DC converter is configured to provide power supply to at least one element of a transmitter subsystem of the half-duplex transceiver. The plurality of snooze control modes correspond to a plurality of snooze duty cycles. In each snooze control mode of the plurality of snoozing modes, the switching circuit and the driver circuit remain in an OFF-state based on a respective snooze duty cycle.

In another embodiment, a half-duplex transceiver is disclosed. The half-duplex transceiver includes a transceiver subsystem and a power management circuit. The transceiver subsystem includes a transmitter subsystem including a power amplifier and a receiver subsystem. The power management circuit includes a direct current to direct current (DC-DC) converter and a snooze mode controller. The DC-DC converter includes a switching circuit and a driver circuit to drive the switching circuit. The DC-DC converter is configured to provide power supply to a power amplifier of a transmitter sub-system of the half-duplex transceiver. The DC-DC converter is further configured to operate in a plurality of snooze control modes. The snooze mode controller is coupled to the DC-DC converter and configured to generate a control signal based on at least one transceiver operating input. The control signal causes the DC-DC converter to operate in one of the plurality of snooze control modes. The plurality of snooze control modes correspond to a plurality of snooze duty cycles. In each snooze control mode of the plurality of snooze control modes, the switching circuit and the driver circuit remain in an OFF-state based on a respective snooze duty cycle.

Other aspects and example embodiments are provided in the drawings and the detailed description that follows.

BRIEF DESCRIPTION OF THE FIGURES

FIG. 6A is an example representation of snooze control modes during reception of a packet, in accordance with an example embodiment;

FIG. 6B is an example representation of snooze control modes during a contention, in accordance with another example embodiment.

The drawings referred to in this description are not to be understood as being drawn to scale except if specifically noted, and such drawings are only exemplary in nature.

DETAILED DESCRIPTION

A number of communication systems including, but not limited to, digital wireless communication systems, wired communication systems, and associated applications utilize half-duplex transceivers for communication purposes. In a typical half-duplex transceiver, data is transmitted and received at different time periods. In various existing half-duplex transceivers, power consumption is high as a direct current to direct current (DC-DC) converter used in the half-duplex transceiver supplies power to one or more elements (for example, a power amplifier) of a transmitter subsystem of the half-duplex transceiver even when such elements are required to be in an OFF-state during a reception phase of the half-duplex transceiver, or on other occasions when such elements are not necessarily to be in ON-state. In various example embodiments of the present disclosure, a snooze mode controller is used with the DC-DC converter to selectively snooze the DC-DC converter to decrease the power consumption of the half-duplex transceiver primarily in the reception phase and also on other occasions. Various example embodiments of the present disclosure are presented herein with reference to FIGS. 1 to 7.

Figure 1:
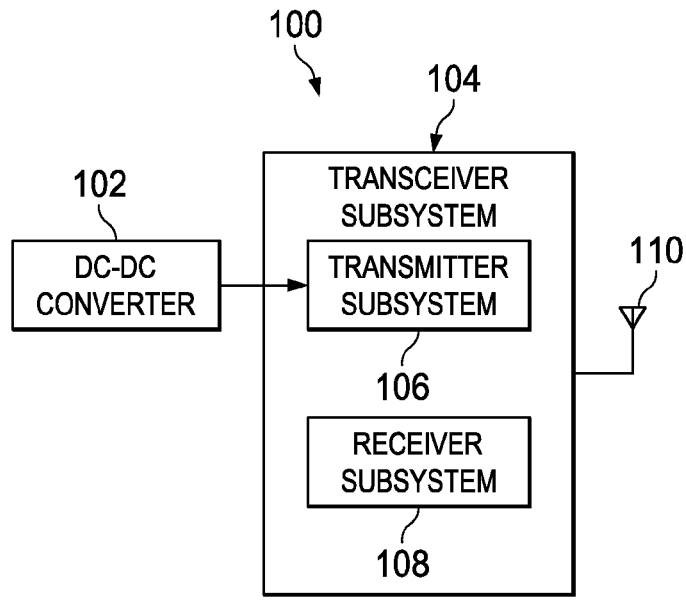
FIG. 1 is a block diagram of an example communication system, where various example embodiments of the present disclosure can be implemented.

FIG. 1 is a block diagram of a communication system 100, where various example embodiments of the present disclosure can be implemented. In this broad level representation of FIG. 1, the communication system 100 is shown as a transceiver, designed to transmit and receive signals. Examples of the communication system 100 include, but are not limited to, a subscriber station, a wireless device, a cellular telephone, a cordless telephone, a handheld two-way radio, a Session Initiation Protocol (SIP) phone, a wireless local loop (WLL) station, a personal digital assistant (PDA), a handheld device having wireless connection capability, other processing device connected to a wireless modem fixed telephone systems, mobile computer or media players with communication capabilities, and other communication devices. The communication system 100 includes a direct current to direct current (DC-DC) converter 102, a transceiver subsystem 104 including a transmitter subsystem 106 and a receiver subsystem 108, and an antenna 110. The DC-DC converter 102 is supplied with a battery voltage from a battery voltage source (not shown).

In an example embodiment, the transceiver subsystem 104 is a half-duplex transceiver that includes the transmitter subsystem 106 for transmitting data and the receiver subsystem 108 for receiving data. Some components of the transmitter subsystem 106 and the receiver subsystem 108 may be a common component. The transmitter subsystem 106 and the receiver subsystem 108 are configured to operate at different time intervals for transmission and reception of data, respectively. For example, during a transmission phase of the transceiver subsystem 104, the transmitter subsystem 106 is in an active state and the receiver subsystem 108 is in an inactive state; and during a reception phase of the transceiver subsystem 104, the receiver subsystem 108 is in the active state and the transmitter subsystem 106 is in the inactive state.

Examples of the DC-DC converter 102 may include, but are not limited to, a buck-boost converter, a boost converter, a buck converter and a flyback type converter. The DC-DC converter 102 is responsible for power management of at least one element, for example, a power amplifier (PA) of the transmitter subsystem 106. During the reception phase, when the transmitter subsystem 106 is in the inactive state, the DC-DC converter 102 is configured to remain in one or a plurality of snooze modes. Herein, the plurality of snooze control modes correspond to a plurality of snooze duty cycles and wherein in each snooze control mode, one or more components of the DC-DC converter 102 remain in OFF state to reduce the power consumption. For instance, in a snooze control mode, a switching circuit and a driver circuit of the DC-DC converter 102 remain in an OFF-state based on a respective snooze duty cycle of the snooze control mode. Various example embodiments of the present disclosure provide controlling the DC-DC converter 102 so as to operate the DC-DC converter 102 in the plurality of snooze control modes when the transmitter subsystem 106 is in the inactive state. For instance, a controller such as a snooze mode controller can be employed to control the plurality of snooze control modes of the DC-DC converter 102 based on at least one transceiver operating input. In various example embodiments, the transceiver operating input can be obtained from a physical layer (PHY) subsystem and/or a medium access control layer (MAC) subsystem of the transceiver subsystem 104. Various example embodiments of operating the DC-DC converter 102 in the plurality of snooze control modes are further described in reference to FIGS. 2 to 7.

Figure 2:
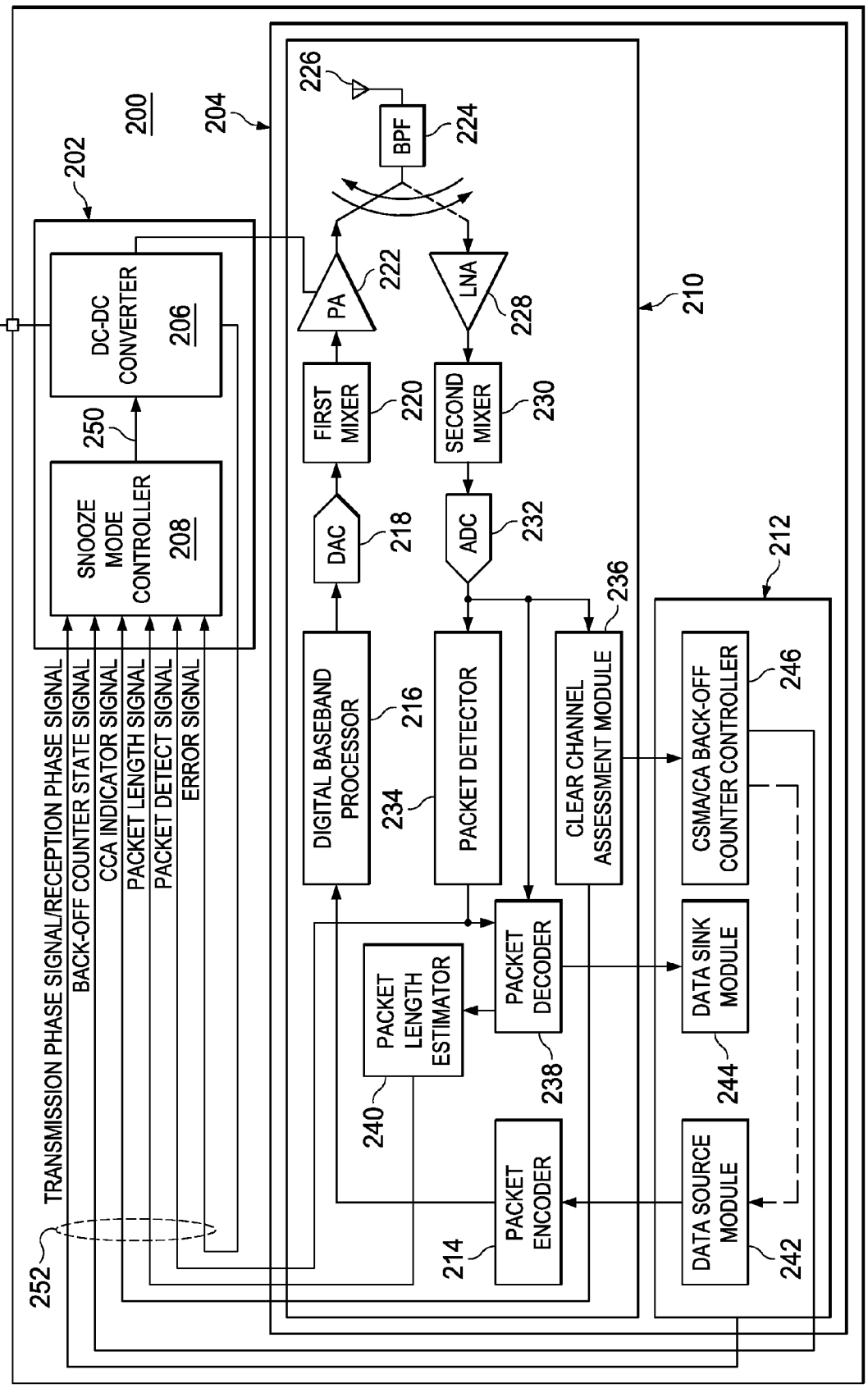
FIG. 2 is a block diagram of a half-duplex transceiver, in accordance with an example embodiment.

FIG. 2 is a block diagram of a half-duplex transceiver 200 of a communication system, in accordance with an example embodiment. The half-duplex transceiver 200 includes a power management circuit 202 and a transceiver subsystem 204. It should be understood that the half-duplex transceiver 200 can include circuit elements other than the power management circuit 202 and the transceiver subsystem 204, however those circuit elements are not presented herein for the sake of brevity. The power management circuit 202 includes a DC-DC converter 206 and a snooze mode controller 208.

The transceiver subsystem 204 includes a transmitter subsystem and a receiver subsystem along with other components. In this example representation, the transmitter subsystem (an example of the transmitter subsystem 106 of FIG. 1) includes a packet encoder 214, a digital baseband processor 216, a digital-to-analog converter (DAC) 218, a first mixer 220, a power amplifier (PA) 222, a band pass filter (BPF) 224, and an antenna 226. The receiver subsystem (an example of the receiver subsystem 108 of FIG. 1) includes the antenna 226, the band pass filter BPF 224, a low noise amplifier (LNA) 228, a second mixer 230, an analog-to-digital converter (ADC) 232, a packet detector 234, a clear channel assessment (CCA) module 236, a packet decoder 238, and a packet length estimator 240. It should be understood that various components of the transmitter subsystem and the receiver subsystem are shown as representative purposes; and among the shown components, some components can be optional and/or two or more components can be embodied as a single component, or even the transmitter subsystem and the receiver subsystem can include additional components than those shown in FIG. 2. In a non-limiting example representation, the transceiver subsystem 204 can also be considered as including a physical layer (PHY) subsystem 210 and a medium access control layer (MAC) subsystem 212. The PHY subsystem 210 includes the packet encoder 214, the digital baseband processor 216, the DAC 218, the first mixer 220, the power amplifier 222, the band pass filter 224, the antenna 226, the low noise amplifier 228, the second mixer 230, the ADC 232, the packet detector 234, the clear channel assessment module 236, the packet decoder 238 and the packet length estimator 240. The MAC subsystem 212 includes a data source module 242, a data sink module 244 and a carrier sense multiple access with collision avoidance (CSMA/CA) back-off counter controller 246. It should be noted that the MAC subsystem 212 is shown for example purposes only and can include additional or different components than that are shown in FIG. 2. For instance, the CSMA/CA back-off counter controller 246 is an example specific to IEEE 802.11 wireless LAN, and the MAC subsystem 212 can include different suitable components as per other MAC layer protocols. In one embodiment, the MAC subsystem 212 includes the CCA module 236.

The DC-DC converter 206 converts a battery voltage (VBAT) that is received from a battery source 248 to an operating voltage and the operating voltage is provided to operate at least one element of the transmitter subsystem. For example, the DC-DC converter 206 supplies the operating voltage to the power amplifier 222 so as to operate the power amplifier 222.

In an example, the MAC subsystem 212 initiates a transmission phase and generates a transmission phase signal (TX). The data source module 242 provides or delivers source data for transmission purposes. Herein, the 'source data' refers to information in any suitable format that can delivered via a telephone line, coaxial cable, optical fiber, microwaves, radio waves, television signals or satellite signals. The source data from the data source module 242 of the MAC subsystem 212 is received by the packet encoder 214 of the PHY subsystem 210. The packet encoder 214 (also referred to as a packet modulator) is configured to encode, for example by using multi-carrier orthogonal frequency division modulation (OFDM) symbol encoding, and to modulate the source data into at least one packet. In some examples, the OFDM symbol encoding can include error correction, encoding and interleaving. The digital baseband processor 216 performs baseband processing on the at least one packet to convert encoded data into baseband signals. The DAC 218 converts the baseband signals from digital to analog. The first mixer 220 up-converts frequency of the baseband signals and provides the up-converted signal to the power amplifier 222. The power amplifier 222 amplifies the up-converted signal to generate an amplified signal. The band pass filter 224 rejects noise components (caused due to up-conversion of the baseband signals) of the amplified signal and only allows a desired frequency band of the amplified signal to pass through the antenna 226 with low distortion.

In an example, the MAC subsystem 212 initiates a reception phase and generates a reception phase signal (RX). The antenna 226 in the PHY subsystem 210 receives a radio frequency (RF) signal. The RF signal is passed through the band pass filter 224 that allows a desired frequency band of the RF signal with low distortion. The LNA 228 amplifies the RF signal received from the band pass filter 224. The second mixer 230 is configured to down-convert frequency of the RF signal to generate a baseband signal. The baseband signal is converted from analog to digital by the ADC 232. A digital baseband signal is provided to both the packet detector 234 and the CCA module 236. The packet detector 234 continuously monitors the RF signal to check for a code (for example, a Barker code) that indicates that a packet is to be received. The CCA module 236 of the PHY subsystem 210 checks status of a channel and provides the status to the MAC subsystem 212. The packet decoder 238 (also referred to as the packet demodulator) is used for decoding the packet. In an example, the packet length estimator 240 determines length of the packet based on a packet header information of the packet. The data sink module 244 collects the packet. In an example, 'the data sink' may represent a device equipped with a transceiver or receiver based on a long-term evolution (LTE) standard. Examples of the data sink include, but are not limited to, a computer, a control system, a home appliance, and the like. The CSMA/CA back-off counter controller 246 sets a back-off counter that counts down to 0 from a pre-determined number for a random period of time (also referred to as a back-off factor) if it is determined from the CCA module 236 that the channel is free. If the channel is determined to be still free when the back-off counter reaches 0, another transmission phase is started else the back-off counter is set again and the process is repeated.

The snooze mode controller 208 is coupled to the DC-DC converter 206 and is configured to generate a control signal 250 based on at least one transceiver operating input 252 of the half-duplex transceiver 200. In some embodiments, the at least one transceiver operating input 252 includes, but is not limited to, at least one PHY input from the PHY subsystem 210 of the half-duplex transceiver 100, at least one MAC input from a MAC subsystem 212 of the half-duplex transceiver 100, and a voltage error signal from the DC-DC converter 206. The at least one PHY input includes at least one of a packet detect signal from the packet detector 234, a packet length signal from a packet length estimator 240 and a CCA indicator signal from the CCA module 236. In an example, the packet detect signal provides a high status (or a logic HIGH) if a packet is detected by the receiver subsystem and provides a low status (or a logic LOW) if no packet is detected. In an example embodiment, the packet length signal can represent a number indicating length of the packet, for example, in micro seconds. In an example embodiment, the snooze mode controller 208 is configured to generate the control signal 250 based on the packet length signal. In an example, the CCA indicator signal provides a high status if the channel is clear (free) for transmission and provides a low status if the channel is busy. The at least one MAC input includes at least one of a back-off counter state signal from the CSMA/CA back-off counter controller 246, and a transmission phase signal or a reception phase signal from the MAC subsystem 212. In an example, the back-off counter state signal provides a current value of the back-off counter, and the snooze mode controller 208 is configured to use the current value of the back-off counter to generate the control signal 250. In one embodiment, the at least one MAC input includes the CCA indicator signal from the CCA module 236 if the CCA module 236 is in the MAC subsystem 212. In an example, the transmission phase signal is provided to indicate that the transmission phase is initiated and the reception phase signal is provided to indicate that the reception phase is initiated.

The control signal 250 causes the DC-DC converter 206 to operate in one of the plurality of snooze control modes. The snooze control modes correspond to a plurality of snooze duty cycles. The control signal 250 may be a pulse having pre-determined duty cycles configured as per the respective snooze control modes. For example, one snooze control mode corresponds to 50% snooze duty cycle and another snooze control mode corresponds to 75% snooze duty cycle. In each snooze control mode, a switching circuit and a driver circuit of the DC-DC converter 206 remain in an OFF-state based on a respective snooze duty cycle. For example, if it is determined from the packet detect signal (an example of the transceiver operating input 252) that a packet is detected and from the packet length signal (another example of the transceiver operating input 252) that the packet is a long packet, the control signal 250 causes the DC-DC converter 206 to operate in the snooze control mode corresponding to 75% snooze duty cycle (hereinafter also referred to as '75% snooze control mode'), which is eventually changed to the snooze control mode corresponding to 50% snooze duty cycle (hereinafter also referred to as '50% snooze control mode'), when it is required to subsequently switch to the transmission phase with less turn-around time. For example, if it is determined from the back-off counter state signal (an example of the transceiver operating input 252) that the back-off counter is nearing 0, the control signal 250 causes the DC-DC converter 206 to operate in the 50% snooze control mode in order to subsequently switch to the transmission phase with less turn-around time. Some examples of the snooze control modes are further described with reference to FIGS. 4A-6B. An example configuration of the DC-DC converter 206 including the switching circuit and the driver circuit is described with reference to FIG. 3.

Figure 3:
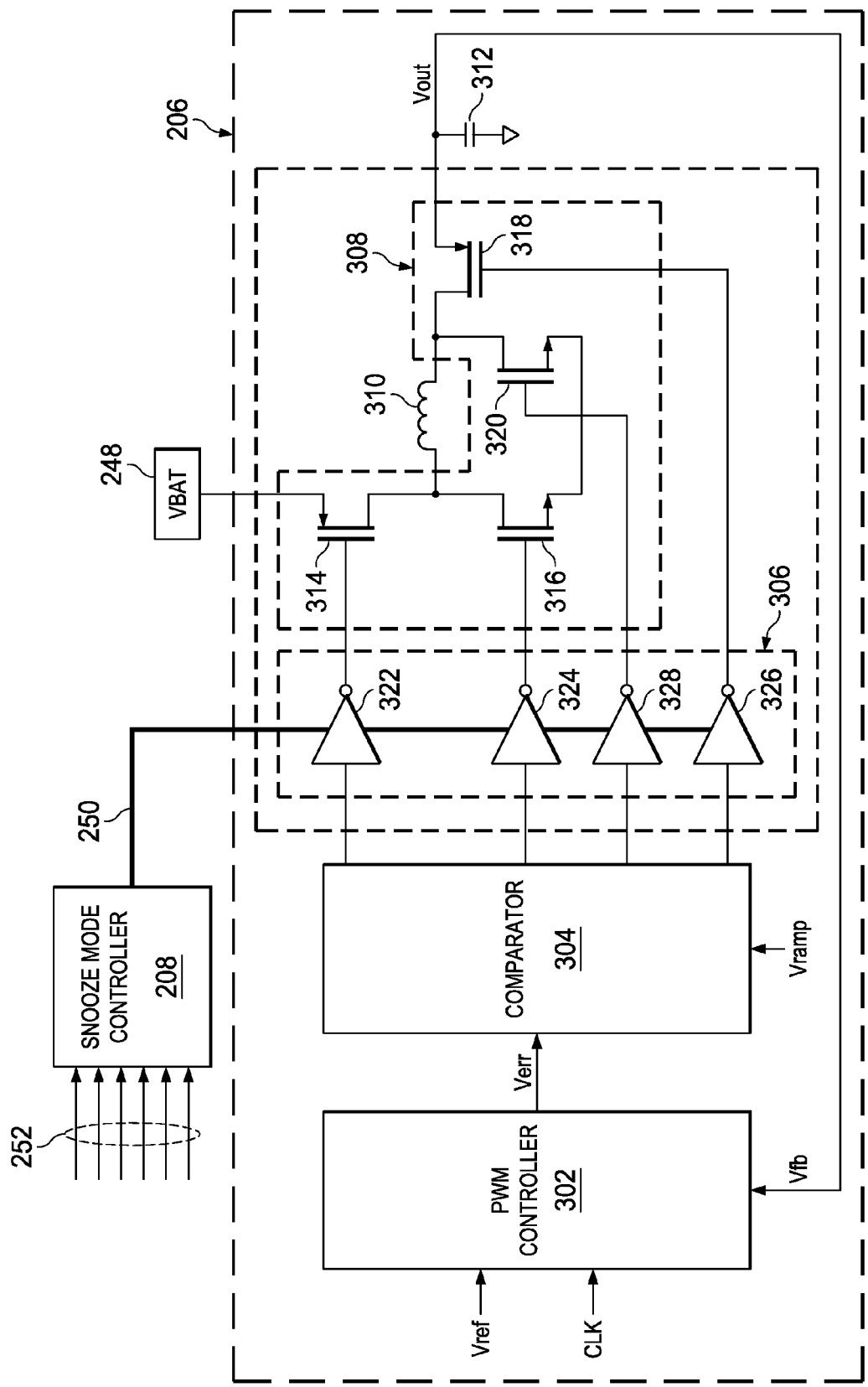
FIG. 3 is a circuit diagram of a direct current to direct current (DC-DC) converter, in accordance with an example embodiment.

Referring now to FIG. 3, a circuit diagram of a DC-DC converter, for example the DC-DC converter 206, is shown, in accordance with an example embodiment of the present disclosure. The DC-DC converter 206 is an example of a buck-boost converter. Herein, the term 'buck-boost converter' refers to a type of DC-DC converter such that an output voltage of the DC-DC converter 206 can be configured as either higher or lower than an input voltage (for example, VBAT) provided to the DC-DC converter 206. In this example representation of the DC-DC converter 206, it is shown as to include a pulse width modulation (PWM) controller 302, a comparator 304, a driver circuit 306, a switching circuit 308, an inductor 310 and a capacitor 312.

In this non-limiting example, the switching circuit 308 includes switches, for example, transistors 314, 316, 318, and 320. In this example, the transistor 314 and 318 are p-type metal oxide semiconductor (PMOS) transistor, and the transistors 316 and 320 are n-type metal oxide semiconductor (NMOS) transistor. Each of the transistors 314, 316, 318, and 320 are driven by the driver circuit 306, where driver circuit 306 includes drivers 322, 324, 326 and 328. For instance, the driver 322 drives gate of the transistor 314, the driver 324 drives gate of the transistor 316, the driver 326 drives gate of the transistor 318, and the driver 328 drives gate of the transistor 320. A source of the transistor 314 is coupled to the battery source 248 and a drain of the transistor 314 is coupled to a drain of the transistor 316 and to one terminal of the inductor 310. A source of the transistor 316 is coupled to a source of the transistor 320. A drain of the transistor 318 and a drain of the transistor 320 are coupled to another terminal of the inductor 310. An output (Vout) of the DC-DC converter 206 is derived from a source of the transistor 318 that is coupled to the capacitor 312.

The PWM controller 302 is controlled by a clock signal (CLK) and is configured to receive a reference signal (Vref) and an output feedback signal (Vfb). The output feedback signal Vfb is generated in response to an output voltage (Vout) of the DC-DC converter 206. On comparing the reference signal Vref and the output feedback signal Vfb, an error signal (Verr) is determined. The error signal Were is further compared with a ramp signal (Vramp) by the comparator 304 so as to generate switching signals for the drivers 322, 324, 326 and 328 of the driver circuit 306. In an example embodiment, the ramp signal can be generated using the clock signal CLK. The switching signals are generated in order to control the ON/OFF of the transistors 314, 316, 318, and 320 for regulating the Vout, in response to variation of the error signal Verr. Accordingly, a control loop formed by the capacitor 312, the PWM controller 302 and the comparator 304, among other components is used to control the operation of the DC-DC converter 206 so as to generate the regulated Vout signal.

The snooze mode controller 208 is configured to provide a control signal 250 to the driver circuit 306 to operate the DC-DC converter 206 in one of a plurality of snooze control modes based on the transceiver operating input(s) 252. Each snooze control mode corresponds to a snooze duty cycle. For instance, one snooze control mode corresponds to a 50% snooze duty cycle, and may be referred to as 50% snooze control mode. In an example, in the 50% snooze control mode, the control signal 250 is a pulse with 50% duty cycle, and the drivers 322, 324, 326 and 328 can be gated to the control signal 250 of 50% snooze duty cycle. Accordingly, the drivers 322, 324, 326 and 328 remain in the OFF-state for the 50% of each pulse of the control signal 250, and remain in the ON-state for the remaining 50% of the each pulse of the control signal 250. Similarly, in another snooze control mode corresponding to 85% snooze duty cycle, the drivers 322, 324, 326 and 328 can be gated to a control signal of 85% snooze duty cycle. In this example, the drivers 322, 324, 326 and 328 remain in an OFF-state for the 85% of each pulse of the control signal and remain in an ON-state for the remaining 15% of the each pulse of the control signal.

The selection of the plurality of snooze modes depends upon the transceiver operation input 252. As described in relation to FIG. 2, the at least one transceiver operating input 252 includes at least one PHY input (for example, at least one of a packet detect signal from the packet detector 234, a packet length signal from a packet length estimator 240 and a CCA indicator signal from the CCA module 236), at least one MAC input (for example, at least one of a back-off counter state signal from the CSMA/CA back-off counter controller 246, and a transmission phase signal or a reception phase signal from the MAC subsystem 212), and the error signal Verr received from the DC-DC converter 206.

In an example embodiment of each snooze control mode, though the control signal 250 generated from the snooze mode controller 208 is configured to maintain the driver circuit 306 and the switching circuit 308 to be in On/OFF-states based on the snooze control modes, the control signal 250 may not have any impact on the control loop of the DC-DC converter 206. For instance, the control loop of the DC-DC converter 206 is maintained in the ON-state. In an example embodiment, by maintaining the control loop in the ON-state, the control loop reacts immediately during a transition from snooze to the ON-state within a single pulse of the control signal 250, or during turn-around from the reception phase to the transmission phase. It should further be noted that during each snooze control mode, the capacitor 312 discharges slowly and a battery current (Ibat) consumed from the battery source 248 is low.

Various example embodiments of the present disclosure provide selection of the snooze control modes from the plurality of snooze control modes based on the transceiver operating input 252. In one example embodiment, the snooze control mode can be selected by the snooze mode controller 208 based on magnitude of error signal (Verr) of the DC-DC converter 206. For instance, if in a snooze control mode, the snoozing period is of a short duration (for example, a low snooze duty cycle), error of the output voltage Vout is less; whereas if in a snooze control mode, the snoozing period is of a longer duration (for example, a high snooze duty cycle), error of the output voltage tends to become higher and the DC-DC converter 206 can take longer to settle to a final value of the output voltage Vout, upon coming out of the snooze control mode. Some example representations of variation in the output voltage (Vout) of the DC-DC converter 206 for different snooze control modes are explained with reference to FIGS. 4A and 4B; and in an example embodiment, such factors are taken into account to select the snooze control mode from the plurality of snooze control modes for operating the DC-DC converter 206.

Figure 4A:
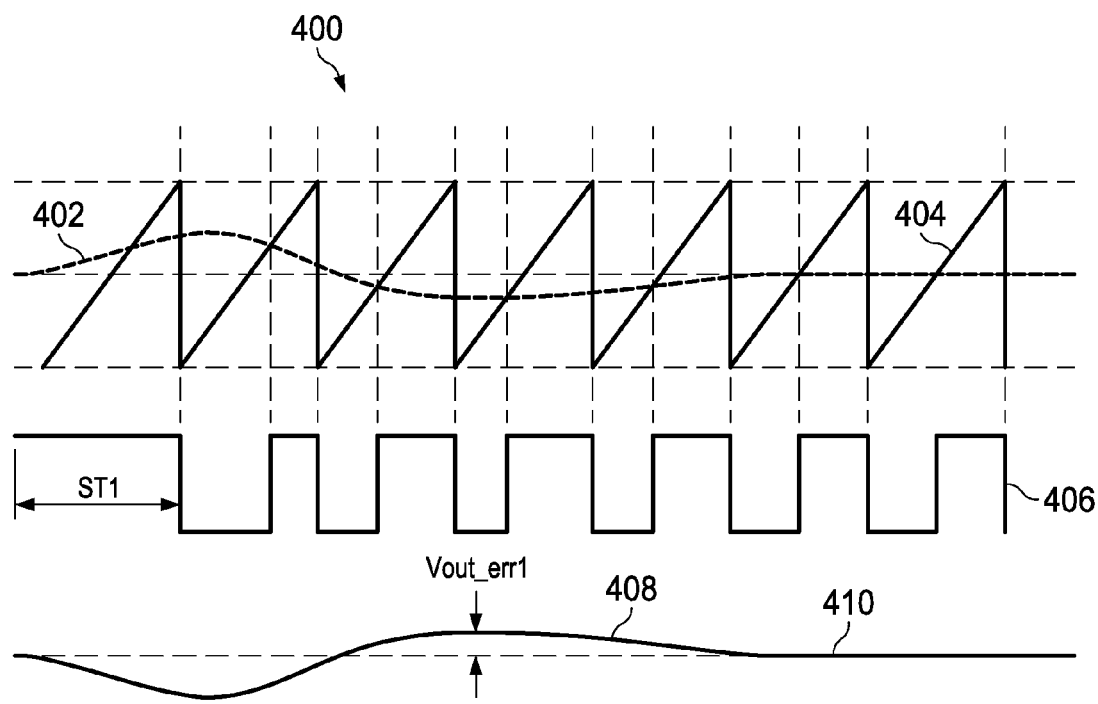
FIGS. 4A and 4B are graphical representations illustrating simulation waveforms of a DC-DC converter in a half duplex transceiver, in accordance with some example embodiments.
Figure 4B:
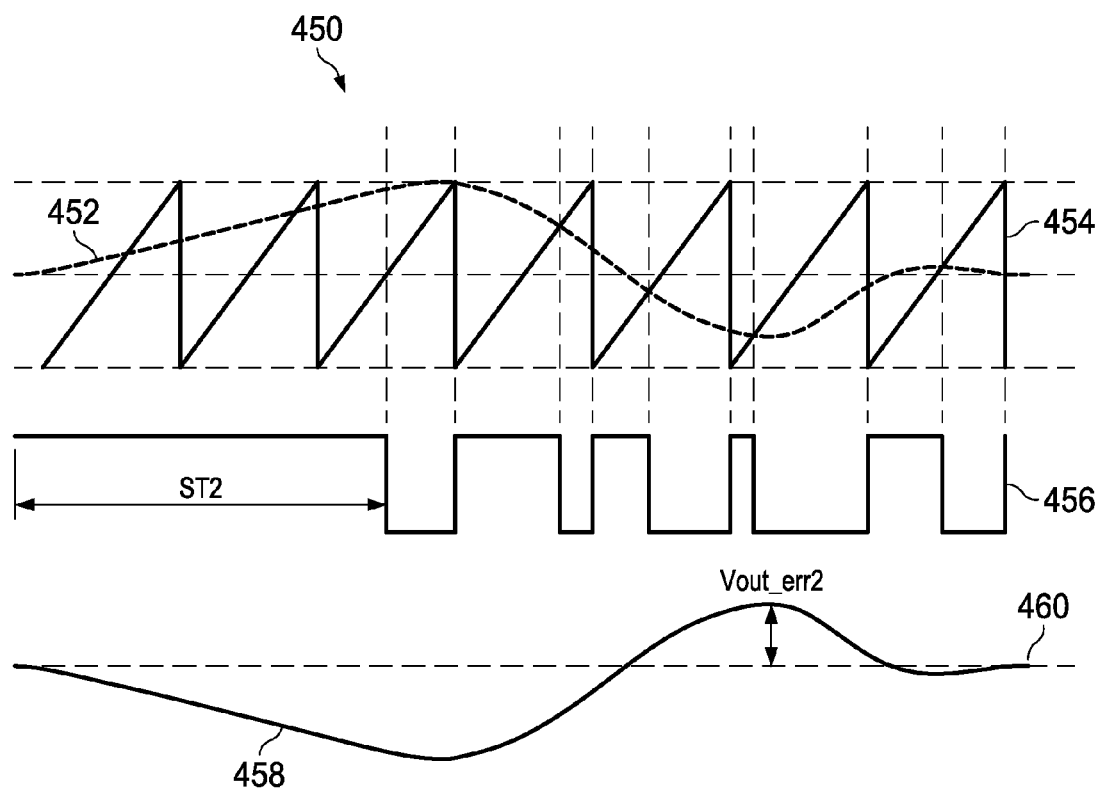

FIGS. 4A and 4B are graphical representations 400 and 450 illustrating simulation waveforms of the DC-DC converter 206. In representation 400, a waveform 402 represents an error signal (Verr) and a waveform 404 represents a ramp signal (Vramp). In representation 450, a waveform 452 represents another error signal (Verr) and a waveform 454 represents a ramp signal (Vramp). A waveform 406 represents a DC-DC driver control signal in a first snooze mode in the representation 400, and a waveform 456 represents a DC-DC driver control signal in a second snooze mode in the representation 450. The snooze duration (ST1) in the waveform 406 is less than the snooze duration (ST2) in the waveform 456. Accordingly, the error signal Verr (a difference of the Vfb and Vref) is greater in the second snooze mode as compared to the first snooze mode, as the ST2 is greater than the ST1. In the first snooze mode, the Verr is less than an optimum magnitude of Vramp (see, 404), whereas the Verr is almost equal to the optimum magnitude of the Vramp (see, 454). A difference of Vout and the Vref is also plotted in the first snooze mode and the second snooze mode. For instance, the plots 408 and 410 represent the Vout and Vref, respectively in the first snooze mode; and the plots 458 and 460 represent the Vout and Vref, respectively in the second snooze mode. As seen in the FIGS. 4A and 4B, Vout_err 1 is also less than the Vout_err2. In some example embodiments of the present disclosure, a duration of the snoozing time (i.e., a suitable snooze control mode) may be determined by taking into account the Vout_err and Verr values in the DC-DC converter 206 for different snooze durations in control signal 250.

Figure 5A:
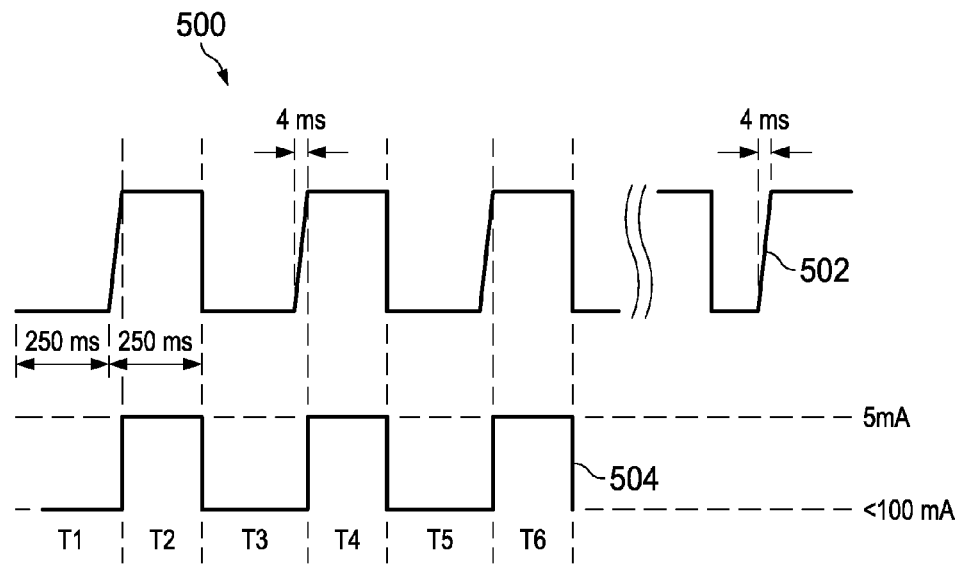
FIGS. 5A and 5B are graphical representations of snooze control modes, in accordance with some example embodiments.

FIG. 5A is a graphical representation 500 illustrating a snooze control mode corresponding to a snooze duty cycle, in accordance with an example embodiment. A waveform 502 is a timing diagram representing instances when the output (Vout) of the DC-DC converter 206 (refer, FIG. 2) is readily available in a snooze control mode. For instance, the waveform 502 represent the readiness of the Vout in a snooze control mode corresponding to a 50% snooze duty cycle during a reception phase of the half duplex transceiver 200 explained with reference to FIG. 2. A waveform 504 corresponds to a signal representative of a battery current (Ibat) provided to the switching circuit 308 (refer, FIG. 3). As shown in the waveform 502 representing the control signal of 50% snooze duty cycle, during snooze time periods (for example, T1, T3, T5, . . . ) the driver circuit 306 (refer, FIG. 3) of the DC-DC converter 206 is gated so as to be switched OFF (or powered OFF), and during ON time periods (for example, T2, T4, T6 . . . ) the driver circuit 306 is gated so as to be switched ON (or powered ON). For instance, the waveform 502 represents 50% snooze duty cycle of a time period of 500 micro seconds (µs), in which for 250 µs, the driver circuit 306 is switched OFF and for the next 250 µs, the driver circuit 306 is switched ON, and this sequence is repeated unless there is a change in the snooze control mode as determined by the snooze mode controller 208 (refer, FIG. 2). In this example, during the snooze time periods (T1, T3, T5 . . . ), the Ibat is significantly smaller (for example, approximately equal to 100 µA), while during the ON time periods (T2, T4, T6 . . . ), the Ibat is approximately equal to 5 mA.

It should be apparent from the waveforms 502 and 504 that the 50% snooze duty cycle offers a worst case latency of 4 µs (a settling time of the Vout) that can be designed to meet the turn-around time for the PHY subsystem 210 from the reception phase to the transmission phase. For instance, consider an example where the turn-around time for the PHY subsystem 210 from the reception phase to the transmission phase is approximately 4 µs. In this example, due to turn-around from the reception phase to the transmission phase at any point of time, the driver circuit 306 can start operating in a normal mode (for example, in a non-snooze control mode or a snooze control mode with zero % duty cycle) without any additional latency. As during the snooze time periods (T1, T3, T5 . . . ) of the waveform 502, the battery current Ibat is nearly zero, the Ibat saved is around 2.45 mA for the snooze control mode corresponding to a 50% snooze duty cycle. However, it is to be noted that as the snooze duty cycle is increased, the worst case latency in settling of the Vout also increases, and such phenomenon is shown in FIG. 5B.

Figure 5B:
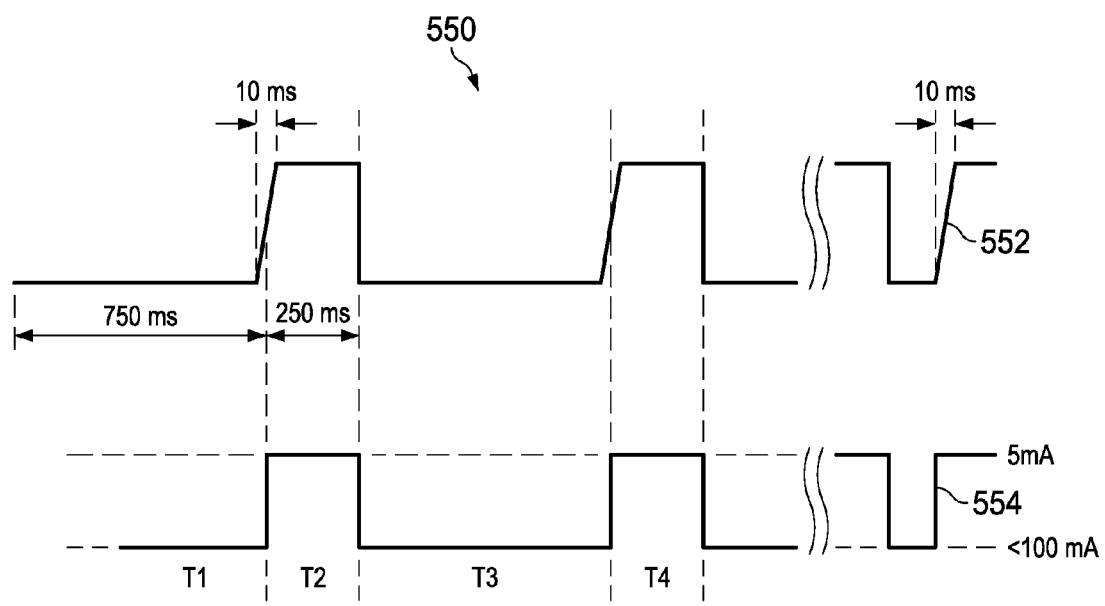

FIG. 5B is a graphical representation 550 illustrating a snooze control mode corresponding to a snooze duty cycle, in accordance with an example embodiment. A waveform 552 is a timing diagram representing instances when the output (Vout) of the DC-DC converter 206 is readily available, in another snooze control mode. For instance, the waveform 552 represent the readiness of the Vout in a snooze control mode corresponding to a 75% snooze duty cycle during the reception phase of the half duplex transceiver 200. A waveform 554 corresponds to a signal representative of a battery current (Ibat) provided to the switching circuit 308. As shown in the waveform 552 representing 75% snooze duty cycle, during snooze time periods (for example, T1, T3 . . . ) the driver circuit 306 of the DC-DC converter 206 is gated so as to be switched OFF, and during ON time periods (for example, T2, T4 . . . ) the driver circuit 306 is gated so as to be switched ON. For instance, the waveform 552 represents 75% snooze duty cycle of a time period of 1000 micro seconds (µs), in which for 750 µs, the driver circuit 306 is switched OFF and for the next 250 µs, the driver circuit 306 is switched ON, and this sequence is repeated unless there is a change in the snooze control mode as determined by the snooze mode controller 208. In this example, during the snooze time periods (T1, T3 . . . ), the Ibat is significantly smaller (for example, approximately equal to 100 μA), and during the ON time periods (T2, T4 . . . ), the Ibat is approximately equal to 5 mA.

It should be apparent from the waveforms 552 and 554 that the 75% snooze duty cycle offers a worst case latency of 10 μs (a settling time of the Vout) that is higher than the worst case latency offered in the 50% snooze duty cycle (Refer FIG. 5A), however, the average Ibat saved is around 3.675 mA that is more than the saving of 2.45 mA in case of 50% snooze duty cycle. Only two snooze duty cycles of 50% and 75% are represented for example purposes only, and it should not be considered limiting, and various other snooze duty cycles can be used for gating the driver circuit 306. In various example embodiments, a snooze control mode from the plurality of snooze control modes can be selected by the snooze mode controller 208 depending upon the transceiver operating input 252. In some example embodiment, the snooze control modes can dynamically change among the plurality of snooze control modes depending upon change in the transceiver operation input 252. For example, if the reception phase is long, the DC-DC converter 206 can operate in the 75% snooze control mode to reduce the power consumption, and if the transmitter phase is about to start, the DC-DC converter 206 can operate in the 50% snooze control mode to enhance the performance. Some examples of such embodiments are described with reference to FIGS. 6A and 6B.

FIG. 6A is an example representation of a plurality of snooze control modes in a reception phase, in accordance with one example embodiment. During the reception phase, a packet including a packet header and the packet data is received, as illustrated in FIG. 6A. In this example representation (an example of the IEEE 802.11a/g WLAN standard), the packet header includes a short sequence (SS) field, a long sequence (LS) field, and a signal (SIG) field. The short sequence field is received by the receiver subsystem in a time period T1 of 8 μs, the long sequence field is received in a time period T2 of 8 μs, and the signal field is received in a time period T3 of 4 μs. The signal field includes length (L) of the packet that provides a number of OFDM symbols to be received after the packet header. In this example representation of FIG. 6A, at the beginning of the reception phase of the packet, the DC-DC converter 206 is in a default snooze control mode, for example the snooze control mode corresponding to the 50% snooze duty cycle. The DC-DC converter 206 remains in the snooze control mode corresponding to the 50% snooze duty cycle until the time period T3.

In this example representation, during a time period T4, as depending upon the length (L) of the packet, the DC-DC converter 206 switches from the snooze control mode corresponding to the 50% snooze duty cycle to the snooze control mode corresponding to the 75% snooze duty cycle. It should be noted that during the time period T4, a first OFDM symbol S(1) of the packet of length L is received, and the control signal causes an instantaneous change from the 50% snooze control mode to the 75% snooze control mode in the DC-DC converter 206. It should be appreciated that the snooze control mode is changed (from the 50% snooze duty cycle to 75% snooze duty cycle), as it is determined from the length information in the signal field in the time period T3 that the packet is a long packet and the length information is leveraged to increase the snooze duty cycle by the snooze mode controller 208 so as reduce the consumption of the battery current (Ibat). The snooze control mode corresponding to the 75% snooze duty cycle is maintained until just before the last OFDM symbol is received or near the end boundary of the packet, for example, during the time period T5, the snooze control mode corresponding to the 75% snooze duty cycle is maintained. Further, during a time period T6, before the reception of an OFDM symbol S(L-1), the snooze mode controller 208 causes a change in the snooze control mode, for example, from the 75% snooze duty cycle to the 50% snooze duty cycle in order to be able to acknowledge the packet in time. The change in the snooze control mode may occur in a worst case transition time of approximately 6 μs and is depicted in time period T6. As shown in the time period T6, the snooze control mode changes to the snooze control mode corresponding to the 50% snooze duty cycle from the 75% snooze duty cycle so as to prepare the PHY subsystem 210 to change from the reception phase to the transmission phase. For instance, as the DC-DC converter 206 operates in the 50% snooze control mode (as shown in time period T7 during which the OFDM symbol S(L-1) and the last OFDM symbol S(L) are received), the DC-DC converter 206 can come out of snoozing mode in a short span of time, for example in 4 μs (as shown in time period T8), so as to enable the transmitter subsystem to send acknowledgement of receipt of the packet. In this example representation, the change of the snooze control mode in the DC-DC converter 206 and coming out of the snoozing control modes can be completed during a time interval between the data frame and the acknowledgement of the data frame (referred to as a 'short inter-frame space' (SIFS)). For example, the SIFS can be equal to 16 μs for IEEE 802.11a/g/n modes and can be equal to 10 μs for IEEE 802.11b mode. Further, during a time period T9, the transmitter subsystem sends the acknowledgement (ACK) and the DC-DC converter 206 goes back to the snooze control mode corresponding to the 50% snooze duty cycle in a subsequent time period for the reception of a next packet, if the reception phase is continued.

FIG. 6B is an example representation of a plurality of snooze control modes during a contention, in accordance with one embodiment. The 'contention' can occur in a MAC method, in which a channel or a broadcast medium needs to be shared for transmission and operates on a first come-first serve basis. If the CSMA/CA back-off counter controller 246 of the MAC subsystem 212 determines that the channel is free, it starts a back-off counter that counts from N to 0, for example from 20 to 0. As shown in FIG. 6B, at the beginning of the contention period, the DC-DC converter 206 is in a default snooze control mode, for example, in a 50% snooze control mode (a snooze control mode corresponding to the 50% snooze duty cycle). The DC-DC converter 206 remains in the 50% snooze control mode till end of the time period T1. At the end of the time period T1, it is determined that the back-off counter is still above a second threshold value N2 (for example N2 is equal to 18), meaning that there is more time to count down to 0. Based on such a determination, during a time period T2, the snooze mode controller 208 changes the 50% snooze control mode to 75% snooze control mode. It should be noted that the change from the 50% snooze control mode to 75% snooze control mode may be made instantaneous. The 75% snooze control mode is maintained until end of a time period T2. In an example embodiment, the time period T2 can be as long as the back-off counter is larger than a first threshold value N1 (for example, N1 can be equal to 2). As shown in a time period T3, as it is determined that the back-off counter has reached equal to or below the N1, the snooze mode controller 208 generates the control signal to change the 75% snooze control mode to the 50% snooze control mode in the DC-DC converter 206, in order to be better equipped for the transmission phase if the channel is still free. In this example representation, the change in the snooze control mode can occur in a worst case transition time of 6 µs. Further, as shown in the time period T4, the DC-DC converter 206 remains in the 50% snooze control mode. In an example, the snooze mode controller 208 causes the DC-DC converter 206 to come out of the 50% snooze control mode to operate in normal mode (for example, no snoozing) before start of the transmission phase. For example, as shown in time period T5, the DC-DC converter 206 is made to come out of snoozing as soon as possible, for example in 4 µs, to start transmission through the channel if the channel is free. During a time period T6, the transmitter subsystem is switched to an ON-state and transmits information in a slot that is available as the channel is free and there is no contention for the channel. It should be noted that the snooze mode controller 208 again causes the DC-DC converter 206 to operate in a suitable snooze control mode (for example, the 50% snooze control mode) if the contention is detected again after the transmission phase.

In an example embodiment, the switching between different duty cycle modes, for example, between the 50% snooze control mode and the 75% snooze control mode can be implemented using various suitable techniques. In an example embodiment, the snooze mode controller 208 can include two counters, for example, a counter_ON and a counter_OFF. The counter_ON is configured to count states corresponding to the ON duration (Ton time) of each switching pulse in a particular snooze control mode, and the counter_OFF is configured to count states corresponding to the OFF duration (Toff time) of each switching pulse in the particular snooze control mode. For instance, in the 50% snooze control mode (associated with the 50% duty cycle), states of both of the counter_ON and the counter_OFF (represented by 'Son' and 'Soff', respectively) can change from 0 to 250 to count the Ton time and the Toff time, respectively, where each count state is incremented with a step duration of 1 µs. In this example, during the Ton period of the switching pulse, the state of the counter_ON ('Son') increments from 0 to 250 and the state of the counter_OFF ('Soff') does not change (for example, remains at 0); and when the 'Son' is incremented to the count state of 250, the Ton period of the switching pulse ends. Further, in the Toff period of the switching pulse, the counter_OFF ('Soff') starts incrementing from 0 to 250, and the 'Son' is reset to 0 and remains constant at 0. When the 'Soff' is incremented to the count state of 250, the OFF period of the switching pulse ends. Further, the same sequence of the changes in the states of the counter_ON and the counter_OFF ('Son' and 'Soff') are performed to realize the switching pulses corresponding to the 50% snooze control mode.

Similarly, the states of the counter_ON ('Son') can be incremented from 0 to 250, and the states of the Counter_OFF ('Soff') can be incremented from 0 to 750, for realizing the Ton and Toff times in switching pulses for the 75% snooze control mode. In a representation, target count states of the counter_ON and counter_OFF can be represented by 'Con' and 'Coff', respectively (for example, 'Con' is a maximum count of the 'Son' and 'Coff' is a maximum count of the 'Soff'); and any suitable combination of the 'Con' and 'Coff' can be selected to realize snooze control modes of various duty cycles. In an example embodiment, based on at least one transceiver input, the target counts 'Con' and 'Coff' of the counter_ON and the counter_OFF, respectively, can be changed on-the-fly, to achieve transitions between different snooze control modes. For example, a combination of "Con1, Coff1" can be changed to "Con2, Coff2", where 'Con1' and 'Con2' represent maximum (or target) count states of the counter_ON and the 'Coff1' and 'Coff2' represent maximum (or target) count states of the counter_OFF. For instance, for performing the transition from the 50% snooze control mode to the 75% snooze control mode, "Con, Coff" can be changed from (250, 250) to (250, 750), or may be from (500, 500) to (250, 750). In some examples, the 'Coff' may be fixed and the 'Con' can be changed for transitioning between two snooze control modes. For instance, the "Con, Coff" can be changed from (300, 300) to (100, 300) for the transition from the 50% snooze control mode to the 75% snooze control mode.

The 'transition time' between one snooze control mode to another snooze control mode depends on a time of receipt of the transceiver input. For example, the transition time depends upon the time of receipt of the transceiver input and current states of the counter_ON and counter_OFF at the time of receipt of the transceiver input. The transition time between the snooze control modes, for example, the 50% snooze control mode and the 75% snooze control mode is explained below with some scenarios.

In scenario 1, a transceiver input (a trigger) is received so as to generate control signal for changing the snooze control mode from the 50% snooze control mode to the 75% snooze control mode. In the scenario 1, the transition from the 50% snooze control mode to the 75% snooze control mode can be performed instantaneously, irrespective of the timing of the receipt of the transceiver input, because the worst case latency associated with the 50% snooze control mode (for example, 4 µs) is smaller than the worst case latency associated with the 75% snooze control mode (for example, 10 µs). Accordingly, in this scenario, in an example implementation, the 'Con' can be fixed to 250, and only the 'Coff' can be changed from the 250 to 750 to perform transition from the 50% snooze control mode to the 75% snooze control mode.

In scenario 2, a transceiver input is received so as to generate control signal for changing the snooze control mode from the 75% snooze control mode to the 50% snooze control mode. In the scenario 2, the transceiver input is received (trigger is applied) either during the Ton period of the switching pulse or during the Toff period of the switching pulse such that a current count state of the counter_OFF ('Soff') is less than 250, the transition is instantaneous by changing the counter_OFF target ('Coff') from 750 to 250. For instance, if the trigger is received before the counter_OFF has counted 250 (the 'Soff'<250), the transition is instantaneous by changing the 'Coff' from 750 to 250.

In scenario 3, a transceiver input is received so as to generate control signal for changing the snooze control mode from the 75% snooze control mode to the 50% snooze control mode. In the scenario 3, the transceiver input is assumed to be received (trigger is applied) during the Toff period of the switching pulse such that the 'Soff' is equal or greater than 250. In this scenario, the control signal causes immediate change from the Toff period to the Ton period of the switching pulse by causing an immediate transition from a low state to a high state in the switching pulse; and with counter_OFF being reset to 0 and counter_ON starting to count up from 0. Accordingly, a counter_ON phase is started and the target count state of the counter_OFF ('Coff') is changed from 750 to 250. In this example scenario, the transition time from the 75% snooze control mode to the 50% snooze control mode can take up to 6 µs. For instance, a transition can be considered to be completed at a point from which the recovery time is equal or less than 4 µs (corresponding to the 50% snooze control mode), and accordingly a worst case transition time of 6 μs would be sufficient for the transition from the 75% snooze control mode to the 50% snooze control mode, in this scenario.

It will be noted that FIGS. 2 to 6B are provided for representation of example embodiments only, and should not be considered as limiting to the scope of the example embodiments. An example method of reduction of power consumption in a half-duplex transceiver is explained further with reference to FIG. 7. It will be noted that for the description of the method in FIG. 7, various references will be made to the FIGS. 2-6B for explaining one or more embodiments of the method for reduction of power consumption in a half-duplex transceiver.

Figure 7:
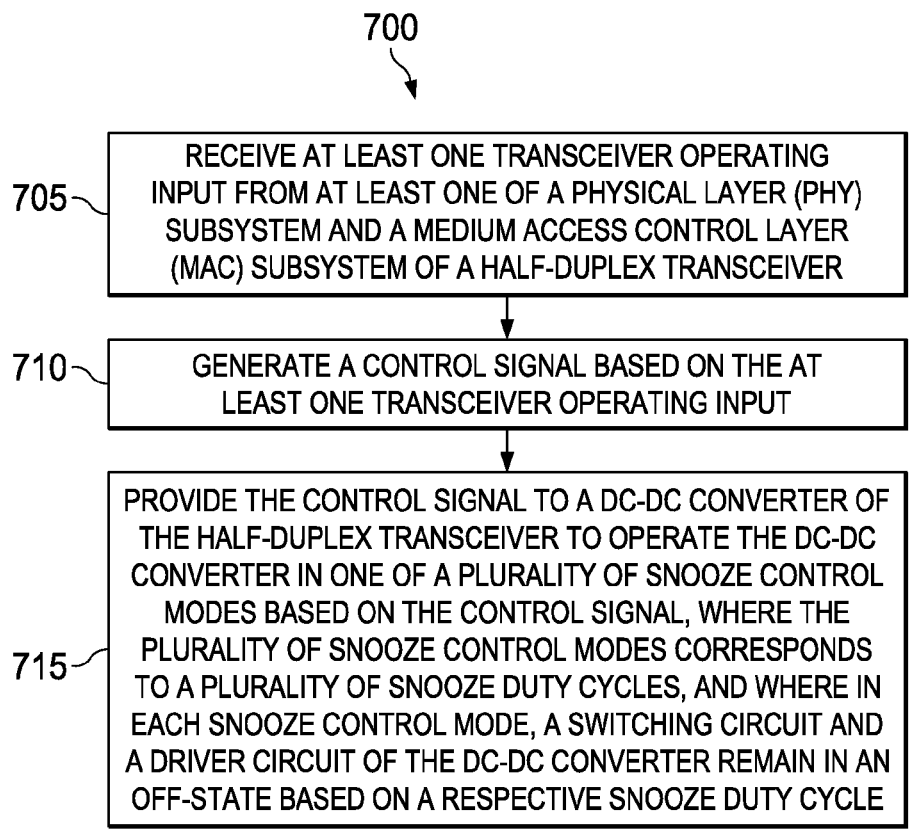
FIG. 7 illustrates a flowchart of an example method of reducing power consumption in a half-duplex transceiver, in accordance with an example embodiment.

FIG. 7 illustrates a flowchart of an example method 700 of reducing power consumption in a half-duplex transceiver, for example the half-duplex transceiver 200 of FIG. 2, according to an example embodiment. The half duplex transceiver includes a direct current to direct current (DC-DC) converter (for example, the DC-DC converter 206) coupled to a snooze mode controller (for example, the snooze mode controller 208). The half-duplex transceiver enables communication in which a transmitter subsystem (for example, the transmitter subsystem of FIG. 2) and a receiver subsystem (for example, the receiver subsystem of FIG. 2) perform transmission and reception of data, respectively, at different time instances.

At 705, at least one transceiver operating input is received from at least one of a physical layer (PHY) subsystem (for example, the PHY subsystem 210 of FIG. 2) and a medium access control layer (MAC) subsystem (for example, the MAC subsystem of FIG. 2) of the half-duplex transceiver. At least one transceiver operating input is received by the snooze mode controller that is configured to control a plurality of snooze control modes of the DC-DC converter. Examples of at least one transceiver operating input include, but are not limited to, at least one PHY input from the PHY subsystem of the half-duplex transceiver, at least one MAC input from the MAC subsystem of the half-duplex transceiver, and a voltage error signal from the DC-DC converter. Examples of the at least one PHY input includes, but are not limited to, at least one of a packet detect signal, a packet length signal and a clear channel assessment indicator signal. Examples of the at least one MAC input includes, but are not limited to, at least one of a back-off counter state signal, and a transmission phase signal or a reception phase signal. In one embodiment, the CCA indicator signal can also be part of the MAC input. The voltage error signal is generated based on a comparison of an output feedback signal of the DC-DC converter with a reference voltage signal (refer, FIG. 3). Various examples of the PHY inputs and MAC inputs are explained with reference to FIG. 2.

At 710, a control signal is generated based on the at least one transceiver operating input. The control signal is generated by the snooze mode controller by taking into account status of the at least one transceiver operating input. In an example embodiment, the control signal may be a pulse with a particular duty cycle, and the duty cycle of the pulse depends upon at least one transceiver operating input. At 715, the control signal is provided to the DC-DC converter of the half-duplex transceiver to operate the DC-DC converter in one of the plurality of snooze control modes based on the control signal. The plurality of snooze control modes corresponds to a plurality of snooze duty cycles. In each snooze control mode, the switching circuit and the driver circuit of the DC-DC converter are in OFF-state based on a respective snooze duty cycle of the snooze control mode. For instance, the snooze control modes can be 40% snooze control mode, 50% snooze control mode, 60% snooze control mode, 75% snooze control mode, etc. In normal transmitter phase or on occasions when the transmitter subsystems are required to be active, the DC-DC converter may operate in a 0% snooze control mode, such as where the DC-DC converter operates in a normal mode, and the battery current (Ibat) is continuously provided to the switching circuit of the DC-DC converter. Further, during the various snooze control modes, the control loop of the DC-DC converter (including a loop formed by a capacitor (for example, the capacitor 312), a pulse width modulation (PWM) controller (for example, the PWM controller 302), and a comparator (for example, the comparator 304) is always powered ON.

It should be understood that the operations 705, 710 and 715 of the method 700 are repetitive, and can be informed for any number of times depending upon the receipt of the transceiver inputs. For instance, at a time instance, if a transceiver input (TI1) for example, a packet data length is received, and it is determined that a long packet is to about to be received in the reception phase, the method 700 can operate the DC-DC converter in a suitable snooze control mode, for example, the 75% snooze control mode. Further, at another time instance, if another transceiver input (TI2), for example, the back-off counter state signal is received representing that the back-off counter is nearing 0, the method 700 operates the DC-DC converter in a suitable snooze control mode, for example, the 50% snooze control mode, by switching from the 75% snooze control mode to the 50% snooze control mode. Accordingly, the control signal is generated in a dynamic manner depending upon the receipt of various transceiver inputs and the method 700 is capable of operating the DC-DC converter in a suitable snooze control mode, by transitioning from an existing snooze control mode to the suitable snooze control mode.

Without in any way limiting the scope, interpretation, or application of the claims appearing below, advantages of one or more of the example embodiments disclosed herein include, reducing power consumption during a reception phase or any other phase of a half-duplex transceiver when the elements of the transmitted subsystems are not required to be active. Various example embodiments are capable of reducing power consumption by implementing different snooze control modes in a DC-DC converter of the half-duplex transceiver by a snooze mode controller. The snooze mode controller receives at least one transceiver operating input from a PHY subsystem, a MAC subsystem, or a voltage error signal from the DC-DC converter and based on the at least one transceiver operating input, the snooze mode controller generates a control signal. The control signal is further used to snooze the DC-DC converter depending upon a selected snooze control mode from the plurality of snooze control modes. Various example embodiments are capable of dynamically switching from one snooze control mode to another snooze control mode depending upon the transceiver operating inputs.

Although the present disclosure has been described with reference to specific example embodiments, it is noted that various modifications and changes can be made to these embodiments without departing from the broad spirit and scope of the present disclosure. For example, the various circuits, etc., described herein can be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods can be embodied using transistors, logic gates, and electrical circuits (for example, application specific integrated circuit (ASIC) circuitry and/or in Digital Signal Processor (DSP) circuitry).

Also, techniques, devices, subsystems and methods described and illustrated in the various embodiments as discrete or separate can be combined or integrated with other systems, modules, techniques, or methods without departing from the scope of the present disclosure. Other items shown or discussed as directly coupled or communicating with each other can be coupled through some interface or device, such that the items can no longer be considered directly coupled to each other but can still be indirectly coupled and in communication, whether electrically, mechanically, or otherwise, with one another. Other examples of changes, substitutions, and alterations ascertainable by one skilled in the art, upon or subsequent to studying the example embodiments disclosed herein, can be made without departing from the spirit and scope of the present disclosure.

It is noted that the terminology "coupled to" does not necessarily indicate a direct physical relationship. For example, when two components are described as being "coupled to" one another, there may be one or more other devices, materials, etc., that are coupled between, attaching, integrating, etc., the two components. As such, the terminology "coupled to" shall be given its broadest possible meaning unless otherwise indicated.

It should be noted that reference throughout this specification to features, advantages, or similar language does not imply that all of the features and advantages should be or are in any single embodiment. Rather, language referring to the features and advantages can be understood to mean that a specific feature, advantage, or characteristic described in connection with an embodiment can be included in at least one embodiment of the present disclosure. Thus, discussions of the features and advantages, and similar language, throughout this specification can, but do not necessarily, refer to the same embodiment.

Various embodiments of the present disclosure, as discussed above, can be practiced with steps and/or operations in a different order, and/or with hardware elements in configurations which are different than those which are disclosed. Therefore, although the disclosure has been described based upon these example embodiments, it is noted that certain modifications, variations, and alternative constructions can be apparent and well within the spirit and scope of the disclosure. Although various example embodiments of the present disclosure are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A power management circuit of a half-duplex transceiver, the power management circuit comprising:
    a direct current to direct current (DC-DC) converter comprising a switching circuit and a driver circuit to drive the switching circuit, the DC-DC converter configured to provide power supply from a battery input to at least one element of a transmitter subsystem of the half-duplex transceiver, and further configured to operate in a plurality of snooze control modes; and
    a snooze mode controller coupled to the DC-DC converter and configured to generate a control signal based on at least one transceiver operating input of the half-duplex transceiver, wherein the control signal causes the DC-DC converter to operate in one of the plurality of snooze control modes,
    wherein the plurality of snooze control modes corresponds to a plurality of snooze duty cycles,
    wherein in each snooze control mode of the plurality of snooze control modes, the switching circuit and the driver circuit remain in an OFF-state based on a respective snooze duty cycle;
    wherein the at least one transceiver operating input comprises at least one physical layer (PHY) input from a PHY subsystem of the half-duplex transceiver; and
    wherein the at least one PHY input comprises at least one of a packet detect signal, a packet length signal and a clear channel assessment indicator signal.

2. The power management circuit of claim 1, wherein the at least one transceiver operating input comprises at least one medium access control layer (MAC) input from a MAC subsystem of the half-duplex transceiver.

3. The power management circuit of claim 2, wherein the at least one MAC input comprises at least one of a back-off counter state signal, and a transmission phase signal or a reception phase signal.

4. The power management circuit of claim 1, wherein the at least one transceiver operating input comprises a voltage error signal received from the DC-DC converter, the voltage error signal being generated based on a comparison of an output feedback signal of the DC-DC converter with a reference voltage signal.

5. The power management circuit of claim 1, wherein in each of the plurality of snooze control modes, a control loop of the DC-DC converter remains in an ON-state.

6. The power management circuit of claim 5, wherein the snooze mode controller is configured to update the control signal to enable the DC-DC converter to switch from one snooze control mode to another snooze control mode of the plurality of snooze control modes based on changes in the at least one transceiver operating input.

7. A method of reducing power consumption in a half-duplex transceiver, the method comprising:
    receiving at least one transceiver operating input from at least one of a physical layer (PHY) subsystem and a medium access control layer (MAC) subsystem of the half-duplex transceiver;
    generating a control signal based on the at least one transceiver operating input; and
    providing the control signal to a direct current to direct current (DC-DC) converter of the half-duplex transceiver to operate the DC-DC converter in one of a plurality of snooze control modes based on the control signal, the DC-DC converter comprising a switching circuit and a driving circuit to drive the switching circuit, DC-DC converter configured to provide power supply from a battery input to at least one element of a transmitter subsystem of the half-duplex transceiver,
    wherein the plurality of snooze control modes corresponds to a plurality of snooze duty cycles,
    wherein in each snooze control mode of the plurality of snooze control modes, the switching circuit and the driver circuit remain in an OFF-state based on a respective snooze duty cycle; and
    wherein the at least one transceiver operating input comprises at least one PHY input from the PHY subsystem of the half-duplex transceiver, the at least one PHY input comprising at least one of a packet detect signal, a packet length signal and a clear channel assessment indicator signal.

8. The method of claim 7, wherein the control signal causes the driver circuit and the switching circuit to be in an ON state during a transmission phase.

9. The method of claim 7, wherein the at least one transceiver operating input comprises at least one MAC input from the MAC subsystem of the half-duplex transceiver, the at least one MAC input comprising at least one of a back-off counter state signal, and a transmission phase signal or a reception phase signal.

10. The method of claim 7, wherein the at least one transceiver operating input comprises a voltage error signal received from the DC-DC converter, the voltage error signal being generated based on a comparison of an output feedback signal of the DC-DC converter with a reference voltage signal.

11. The method of claim 7, wherein in the each snooze control mode, a control loop of the DC-DC converter remains in an ON-state.

12. The method of claim 11 further comprising:
updating the control signal to switch amongst the plurality of snooze control modes based on changes in the at least one transceiver operating input.

13. A half-duplex transceiver, comprising:
a transceiver subsystem comprising a transmitter subsystem comprising a power amplifier, and a receiver subsystem; and
a power management circuit comprising:
a direct current to direct current (DC-DC) converter comprising a switching circuit and a driver circuit to drive the switching circuit, the DC-DC converter configured to provide power supply from a battery input to the power amplifier of the transmitter subsystem, and further configured to operate in a plurality of snooze control modes; and
a snooze mode controller coupled to the DC-DC converter and configured to generate a control signal based on at least one transceiver operating input of the half-duplex transceiver, wherein the control signal causes the DC-DC converter to operate in one of the plurality of snooze control modes, the plurality of snooze control modes corresponding to a plurality of snooze duty cycles and wherein in each snooze control mode of the plurality of snooze control modes, the switching circuit and the driver circuit remain in an OFF-state based on a respective snooze duty cycle;
wherein the half-duplex transceiver comprises a physical layer (PHY) subsystem and wherein the at least one transceiver operating input comprises at least one PHY input from the PHY subsystem of the half-duplex transceiver; and
wherein the at least one PHY input comprises at least one of a packet detect signal, a packet length signal and a clear channel assessment indicator signal.

14. The half-duplex transceiver of claim 13, wherein the half-duplex transceiver comprises a medium access control layer (MAC) subsystem and wherein the at least one transceiver operating input comprises at least one MAC input from the MAC subsystem of the half-duplex transceiver.

15. The half-duplex transceiver of claim 14, wherein in each of the plurality of snooze control modes, a control loop of the DC-DC converter remains in an ON-state.

* * * * *